United States Patent [19]

Wehner et al.

[11] Patent Number: 5,240,282

[45] Date of Patent: Aug. 31, 1993

[54] AIR BAG AND FOLDING TECHNIQUE

[75] Inventors: Mark F. Wehner, Warren; Michael J. Watson, Holly, both of Mich.

[73] Assignee: Allied Signal Inc.

[21] Appl. No.: 887,527

[22] Filed: May 22, 1992

[51] Int. Cl.⁵ .............................................. B65B 63/04
[52] U.S. Cl. ....................................... 280/728; 280/743
[58] Field of Search ................ 280/728, 728 B, 728 R, 280/729, 730, 743

[56] References Cited

U.S. PATENT DOCUMENTS

| | | | |
|---|---|---|---|
| 4,004,828 | 1/1977 | Sogabe et al. | 280/743 R |
| 4,235,453 | 11/1980 | Lawson et al. | 280/728 R |
| 5,004,266 | 4/1991 | Miller et al. | 280/743 A |
| 5,022,675 | 6/1991 | Zelenek, Jr. et al. | 280/743 R |
| 5,140,799 | 8/1992 | Satoh | 280/743 R |
| 5,178,407 | 1/1993 | Kelley | 280/728 A |

*Primary Examiner*—Edwin L. Swinehart
*Attorney, Agent, or Firm*—Markell Seitzman

[57] ABSTRACT

An air bag and method of folding same, the air bag including material defining a top, front, and bottom portions and side panels and an open inlet end, comprising the steps of: securing the inlet end about a retainer, positioning the material so that is lays relatively flat with the top or bottom portion laid upon the folding surface, with the retainer slightly above the surface and with a first portion of the air bag extending to the right of the first end, a second portion extending to the left of the second end of the retainer a middle portion therebetween, folding over the first portion inwardly, toward a second fold line, about a first fold line defining a first folded over portion; folding over the first folded over portion outwardly toward the first fold line about the second fold line, continuing folding the first portion about the first and second fold lines, repeating the above steps to fold the second portion of the air bag, positioning the folded over portions resulting from the folding of the first and second portions of the air bag parallel to one another, and then forming a plurality of pleats and folds forming a pleated end and placing the pleated end adjacent the retainer. Folding material extending from the pleated end against the pleated end and securing the air bag in its folded configuration.

10 Claims, 4 Drawing Sheets

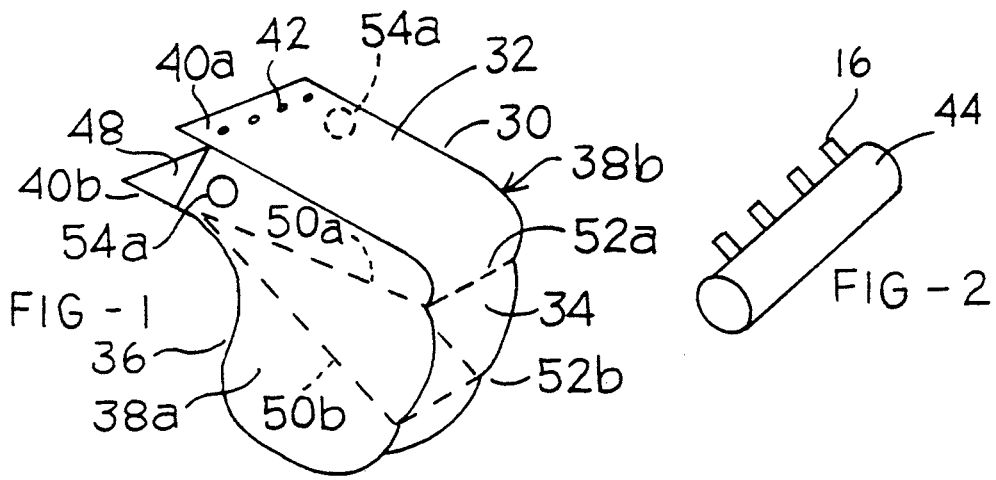
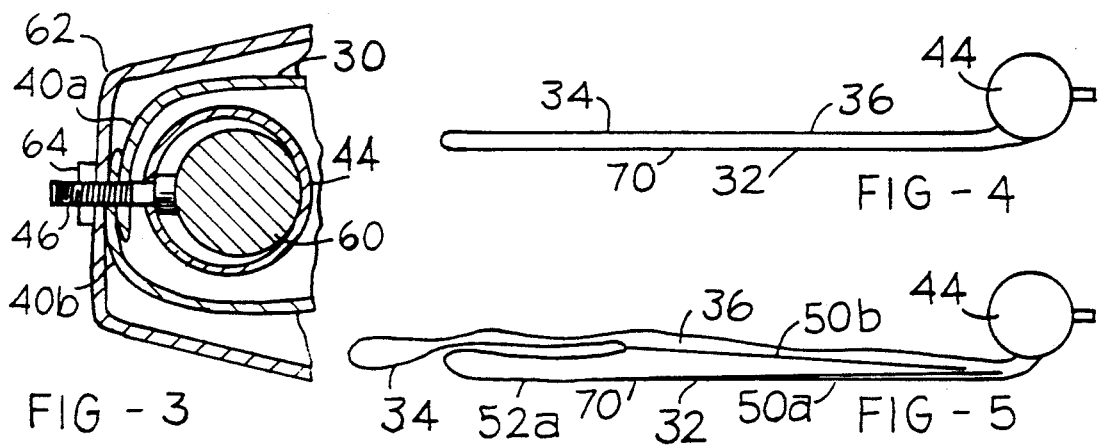
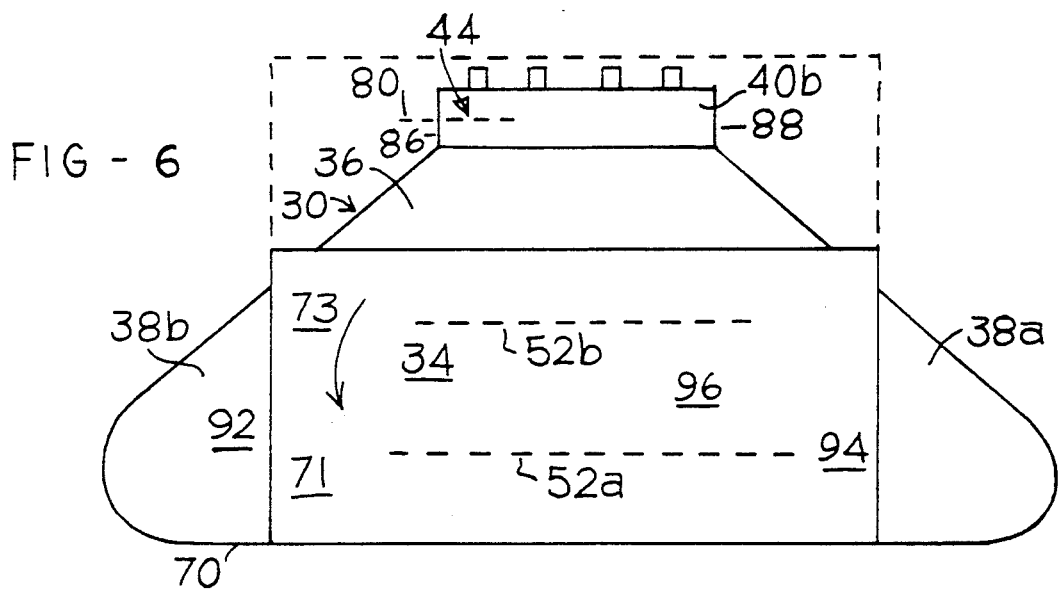

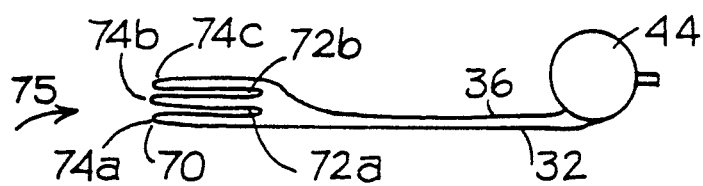
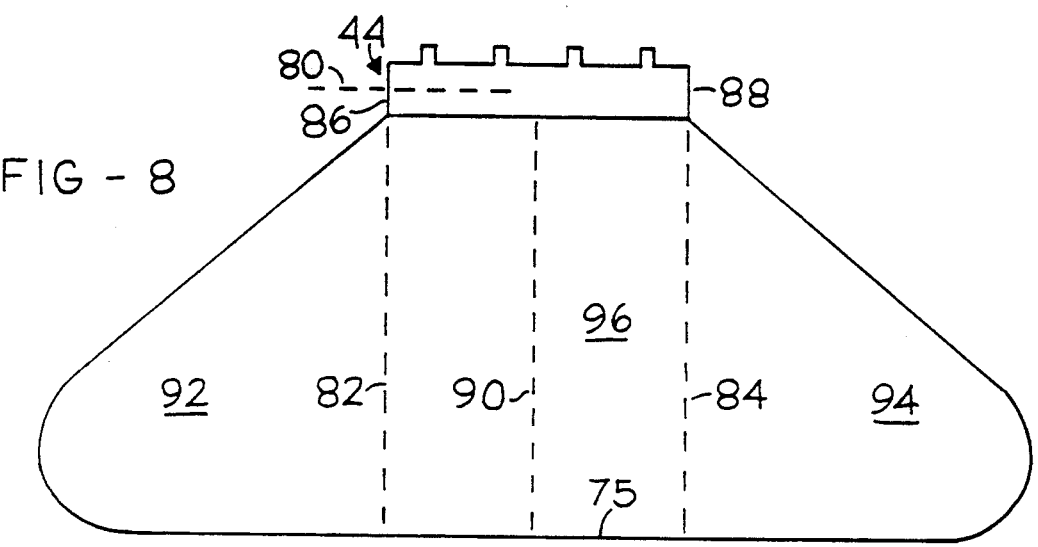
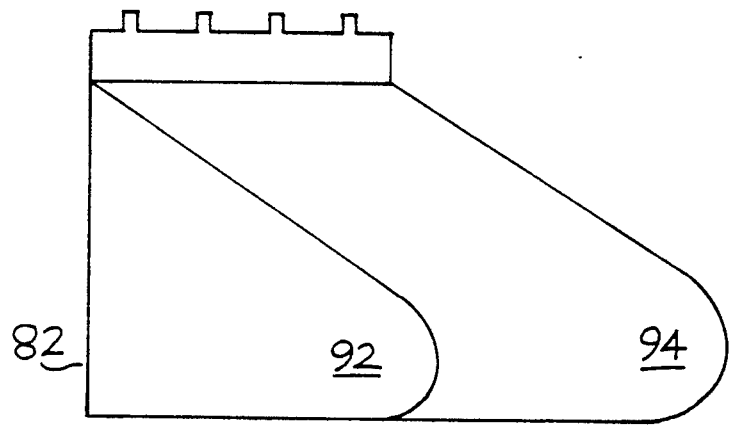
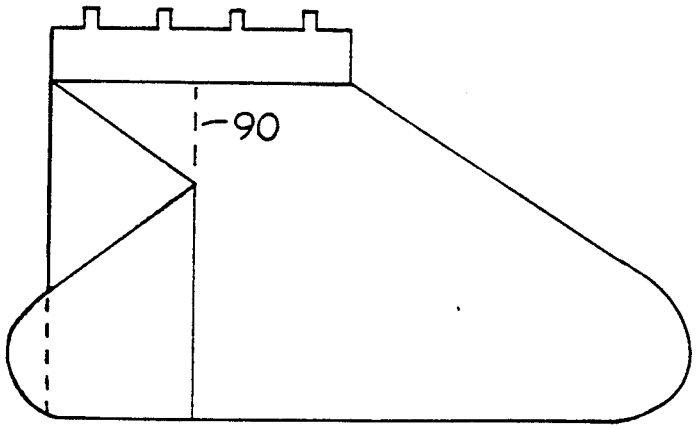

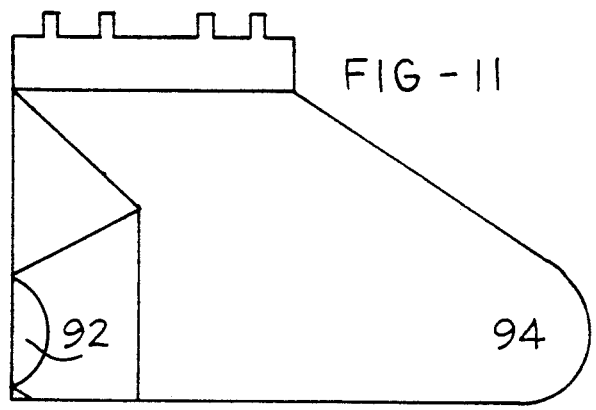
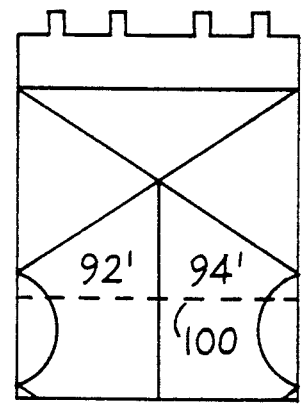
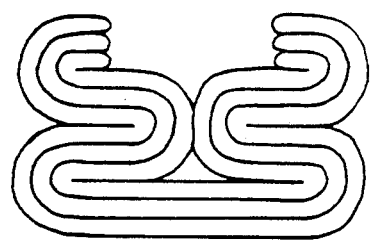
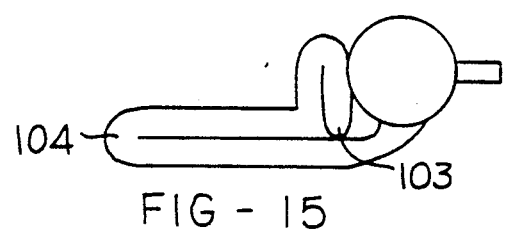
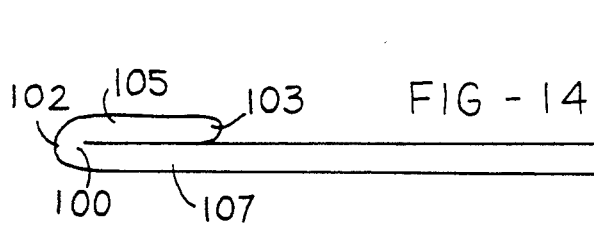
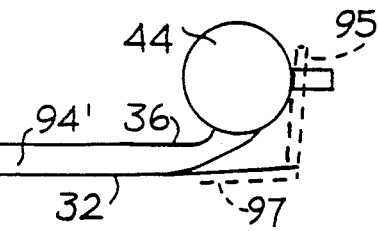
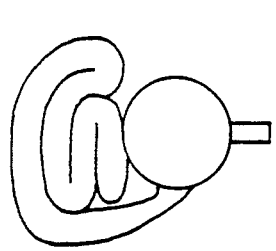
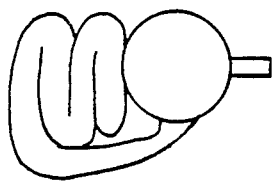
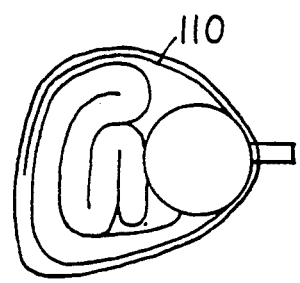

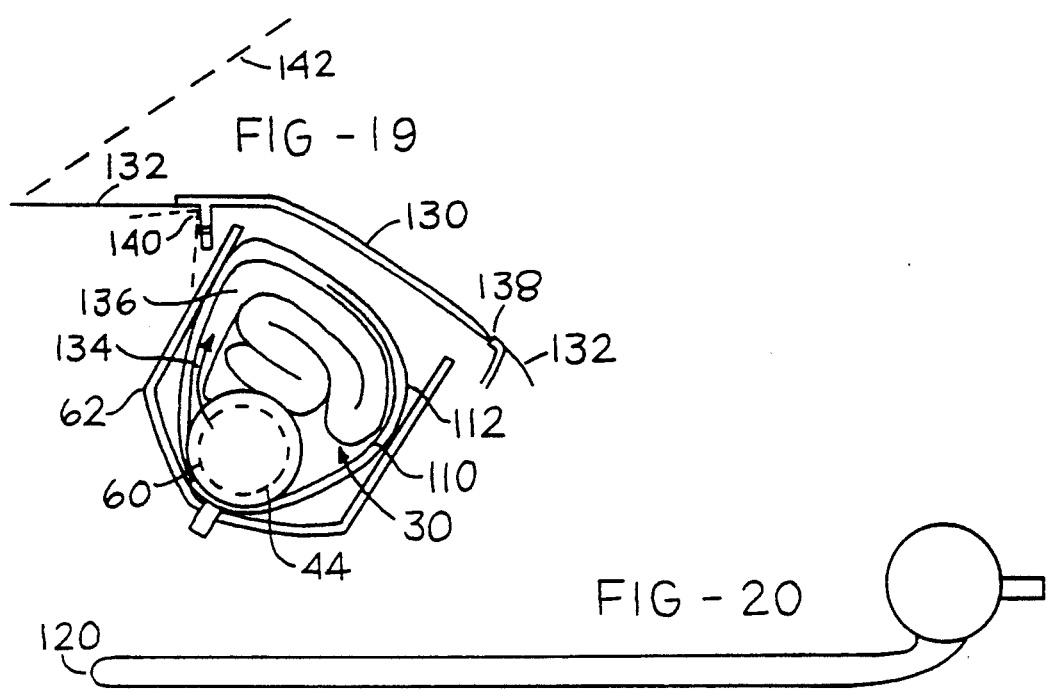
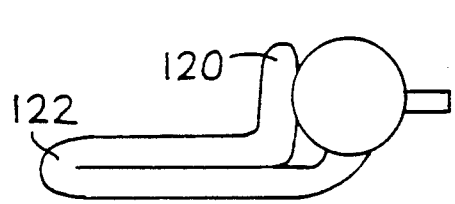
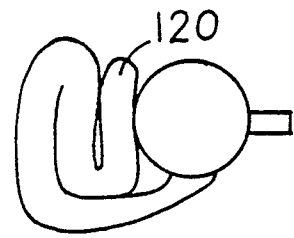
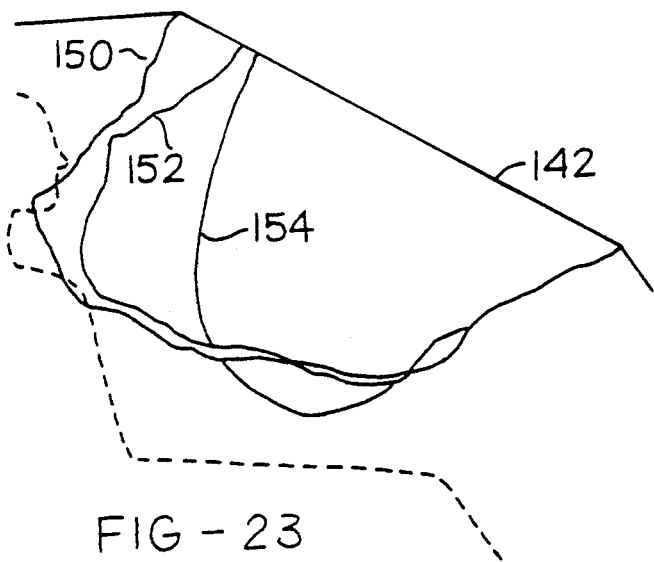
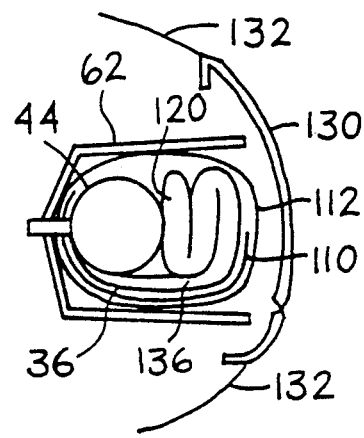

AIR BAG AND FOLDING TECHNIQUE

BACKGROUND AND SUMMARY OF THE INVENTION

The present invention relates to an air bag for use in a passenger safety restraint system and more particularly to an air bag folded in a manner to enhance its operation and improve occupant safety. In addition, the present invention finds specific application with vehicle safety air bags adapted to protect the passenger and middle occupant.

One such air bag is shown in the commonly assigned U.S. Pat. No. 5,022,675 which discloses a folding process that places a plurality of internal side pleats and folds in opposing sides of the air bag to initially reduce the width of the rather large passenger side air bag. Experience shows that using the internal side pleats and folds increases the time to fold an air bag. In addition, this folding technique also takes added time to verify that the pleats and folds are of the desired sizes they are not visible as they as internal. It is an object of the present invention to provide an improved method of folding while still retaining a high degree of occupant safety. As is known in the art the method of folding effects the way the air bag will unfold during deployment. A too aggressive deployment of the air bag will cause the air bag to unfold in a manner that it may impact the occupant causing what is called "bag slap". FIG. 23 which shows comparative inflation data at a fixed time (about 40 msec.) during the deployment process of the same air bag folded three different ways using the some type of gas generator. Numeral 150 shows the deployment characteristics, at this time, of an air bag folded by the method taught in the above U.S. Patent while numeral 152 shows the deployment characteristic of the air bag folded in accordance with the first embodiment of the present invention and numeral 154 shows the deployment charastic in accordance with the second embodiment of the invention. As can be seen from this figure the folding technique of the present invention causes the air bag to deploy slightly further away from the occupant diminishing the occupance of bag slap.

Accordingly the invention comprises an air bag and method of folding same, the air bag including material defining a top, front, and bottom portions and side panels and an open inlet end, comprising the steps of: securing the inlet end about a retainer, positioning the material so that is lays relatively flat with either the top or the bottom portion laid upon the folding surface and with a first portion of the air bag extending to the right of the first end, a second portion extending to the left of the second end of the retainer a middle portion therebetween, folding over the first portion inwardly, toward a second fold line, about a first fold line defining a first folded over portion; folding over the first folded over portion outwardly toward the first fold line about the second fold line, continuing folding the first portion about the first and second fold lines until the there is no longer enough material to be folded over either the first or a third fold line, repeating the above steps to fold the second portion of the air bag, positioning the folded over portions resulting from the folding of the first and second portions of the air bag parallel to one another, the material of the air bag in the folded over configuration farthest from the retainer defining a first end. Forming in the first end a plurality of pleats and folds forming a pleated end and placing the pleated end adjacent the retainer. Folding material extending from the pleated end against the pleated end and securing the air bag in its folded configuration.

Many other objects and purposes of the invention will be clear from the following detailed description of the drawings.

BRIEF DESCRIPTION OF THE DRAWINGS

In the drawings:

FIG. 1 schematically illustrates the typical air bag useable with the present invention FIG. 2 illustrates a diagrammatic view of a retainer.

FIG. 3 illustrates a partial side view showing the retainer, a gas generator and a housing, reaction can or canister.

FIGS. 4 AND 5 show various air bags extended to their full length.

FIGS. 6-18 illustrate various steps in the folding techniques of the air bag.

FIG. 19 shows a typical installation of an air bag and its housing proximate an instrument panel of a vehicle.

FIGS. 20-22 illustrate an alternate embodiment of the present invention.

FIG. 23 shows comparative test data.

FIG. 24 shows an alternative mounting configuration.

DETAILED DESCRIPTION OF THE DRAWINGS

Reference is made to FIG. 1 which illustrates a typical, inflated, passenger side air bag 30. This type of air bag is constructed of a light-weight, woven, nylon material and comprises one or more panels of material sewn together along seams or sew lines. The assembled air bag will typically include a top portion 32, front portion 34, bottom portion 36, and side panels 38a and 38b. Each of these portions or panels may be assembled from one or more smaller pieces of fabric. Only panel 38a is visible in FIG. 1. Extending from the top and bottom portions 32 and 36 respectively, are a plurality of flaps 40a and 40b each containing a plurality of openings such as 42, the purpose of which will be apparent from the description below.

FIG. 2 illustrates a schematic representation of a retainer. As can be seen, the retainer comprises a hollow, cylindrical, structure having a plurality of studs 46 extending therefrom. The retainer secures a gas generator 60 which generates gas to inflate the air bag. The retainer 44 is inserted within the open end 48 of the air bag and the flaps positioned in overlapping relation about corresponding studs 46. A similar construction is shown in the commonly assigned U.S. Pat. No. 5,022,675, herein incorporated by reference. The bag 30 may as an option include a plurality of tethers 50a and 50b (see FIG. 1) sewn to various other portions of the air bag. Two such sew lines 52a and 52b on the front portion of the air bag are shown in FIG. 1. The air bag may also include slits or openings 54a and 54b through which the cylindrically shaped gas inflator 60 may be inserted and positioned within the retainer 44 after the air bag has been folded and secured thereto. Reference is made to FIG. 3 which illustrates a cross-sectional view of the retainer 44 and gas generator 60 secured therein, the flaps 40a and 40b and a stud(s) 46. Also shown in FIG. 3 is a housing or canister 62 into which the folded air bag, retainer and gas generator (air bag module) are placed. The retainer is secured to the housing 62 by a nut 64 received on each of the threaded ends of the studs 46. For the purpose of illustration reference is made to FIG. 4 which illustrates the air bag 30 laid as flat as possible with the top portion 32 placed upon a folding table which is not visible in this figure. The retainer is elevated above to the table to facilatate folding. This configuration is typically achieved by stretching the air bag material outwardly as much as possible. If the air bag does not include tethers it will lay relatively flat is shown in FIG. 4. If however, the air bag includes tethers such 50a and 50b the laid out configuration will resemble that shown in FIG. 5. With the material laid out as in FIGS. 4 or 5 a line 70 is determined which is used to idenfify the extending edge of various pleats that will be formed in the material to reduce its length relative to the retainer 44. Thereafter the material extending forward of this line 70 is moved or folded backwardly towards the retainer achieving the orientation as shown in FIG. 6. If the air bag 30 is extremely large some of its material, in this folded back orientation, may actually extend past the retainer as illustrated by the phantom lines in FIG. 6. In the orientation of FIG. 6 the top portion 32 is relatively taut and the side panels extended laterally outwardly and flattened as much as possible with the front and bottom portions atop the top portion 32 achieving the general shape as shown. In this laid out configuration, the line 70 of the material extending forwardly from the retainer 44 defines a tip end, also referred by to numeral 70. Depending upon how the air bag will eventually be installed relative to a vehicle instrument panel it may be desirable to reverse the initialy folding steps. An alternative to the above is to position the bottom portion 36 on the folding surface as opposed to the top portion 32. In this configuration the retainer will of course be reversed in its mounting fixture and the others portions of the air bag placed atop the bottom portion.

The next step in the folding process is to define a plurality of pleats and tucks in the material to reduce the size of the laid out material. The pleats and tucks are typically formed in the front portion 34 of the air bag. The depth of the various tucks will vary with the specific application and folding technique as discussed below. If for example the air bag 30 contains tethers such as those illustrated in the above figures, the tether sew seam 52a is moved forwardly to the tip end 70 and in doing so the material 71 between the seam 52a and end 70 forms a first tuck 72a and the material 71 and the top portion 32 forms the first pleat 74a. If the air bag does not use tether then material at about the same location is moved forward. To achieve the additional tucks and pleats material such at location 73 is moved forward to the end 70 to form the second and third pleats 74b and 74c and second tuck 72b as can be more particularly seen in FIG. 7. If a tether is used such as tether 52a it will lay flat in this configuration while the other tether 52b may be in some arbitrary orientation depending the size of the second and third pleats. On forming the pleats 74 a,b,c and tucks 72a,b the bag will achieve the shape as generally shown in FIG. 8 having a pleated end 75, which also corresponds to the tip end 70. It should be appreciated that the number of pleats and tucks will vary with the size of the air bag. After the pleats and tucks are formed the bottom portion 36 will lay relatively flat upon the top portion 32 as shown in FIG. 7. Typically the length of the air bag is reduced by about 30 to 75 percent cpmpared to its extended length shown in FIGS. 4 or 5, upon forming the tucks and pleats. It should be appreciated the FIG. 8 is a diagrammatic representation of the outlines of the bag.

Thereafter, three fold lines 82, 84, 90 or locations are defined in the material. Each of the fold lines extends generally perpendicular to a longitudinal axis 80 which runs through the retainer 44. The first and third fold lines 82 and 84 are generally near the respective ends 86 and 88 of the retainer, the distance between the fold lines defines the width of the folded air bag which need not necessarily be equal to the length of the retainer 44. The third fold line 90 is between fold lines 82 and 84. If the air bag is symmetrical, fold line 90 is half way between the first and third fold lines. If however, the air bag is asymmetrical, then the fold line 90 will be spaced closer to one or the other of the fold lines 82 and 84. In the configuration shown in FIG. 8 the partially folded air bag defines a first portion 92, second portion 94 and central portion 96. The first portion 92 is folded inwardly about the first fold line 82 achieving the configuration illustrated in FIG. 9. The inner segment of the first portion 92 is again now folded outwardly along the third fold line 90 achieving the configuration illustrated in FIG. 10. The folding process continues until there is not enough material to be folded over either the first or second fold lines, this configuration being illustrated in FIG. 11. The above folding process is repeated for the second portion 94 of the air bag which is in turn folded about the second and third fold lines 84 and 90 to achieve the configuration shown in FIG. 12. As can be seen, the result of the folding process defines two folded over sections 92' and 94' laid relatively flat with the innermost portions of the folds lightly touching as illustrated in the end view of FIG. 13 or alternatively slightly spaced apart.

Reference is made to FIG. 14 which illustrates the location of the retainer, the top portion of the air bag and the folded over portion 94'. As mentioned above, it has been found that the folding process is facilitated by securing the retainer 44 to a fixture 95 so the retainer 44 is spaced slightly above the folding table 97. To achieve the configuration shown in FIG. 14, the air bag of FIG. 12 is folded about fold line 100 forming a first end pleat or fold 102 with a top flap 105 and bottom flap 107 with the pleated end 75 placed upon the folded over portions 92' and 94' defining a first end fold or pleat 102. The size of the first end pleat typically reduces the length of the air bag shown in FIG. 12 by about 5 to 30 percent. The first end fold 102 is moved into contact with the retainer 44 as illustrated in FIG. 15 with the pleated end 75 pointed downwardly. The remaining material extending from the first end fold or pleat 102 now forms a second end pleat 104. The end pleat 102 is folded over and moved against the first end pleat 100 into an overlapping configuration is illustrated in FIG. 16 or parallel arrangement as illustrated in FIG. 17.

Thereafter an optional deployment flap 110 is installed about the folded air bag (see FIG. 18). The deployment flap comprises another section of air bag material which may or may not be coated with rubber or the like. The purpose of the deployment flap is to protect the air bag from being ripped as it deploys from is stored location below the instrument panel. Reference is briefly made to FIG. 19 which shows a typical installation of the air bag 30, deployment door or other structure within an instrument panel 132. As can be appreciated the air bag 30 may tend to contact rough edges of the deployment door as the air bag is inflated. The deployment flap 110 provides a barrier therebetween to protect the air bag. Returning to FIG. 18 the air bag is maintained in its folded configuration by enveloping the air bag with a tearable material such as Tyvek. As known in the art, the ability of the Tyvek to tear may be enhanced by utilizing material having weakened portions or perforation lines.

Reference is now made to FIG. 20 which illustrates an alternate folding arrangement of the present invention. In this alternate embodiment of the invention the initial folding steps are the same as used in the first embodiment in that the bag is laid flat as shown in FIG. 6. As will be seen this embodiment does not use the end flap 102, consequently when the various pleats and tucks are formed in the tip end 70 of the air bag the tucks extend further into the air bag to shorten its length to approximately that of the partially folded air bag shown in FIG. 14. Typically the pleats and tucks reduce the length of the material by about 50 to 75 percent. Having formed the pleats and tucks the bag is folded as described in conjunction with FIGS. 8–12. The resulting configuration is shown in FIG. 20. The end pleat 120 of the air bag including the pleats and tucks is brought forward to the top of the retainer 44 and the material is urged downwardly against the folding table into the top portion 32 of the air bag 30. As can be seen the end pleat 120 is preferable positioned even with or slightly higher than the top of the retainer 44 which is elevated about 0.5 inches (12.5 mm). The material extending outwardly from the retainer forms an end pleat 122. Thereafter the end pleat is folded over to its final configuration as shown in FIG. 22. A deployment flap can be secure about the folded air bag and secured with a tearable liner as described above.

Upon receipt of a signal that the vehicle is involved in a crash the gas generator 60 is activated releasing or generating inflation gas see arrow 134, FIG. 19. The inflation gas initially and temporarily forms a bubble 136 between the top 32 and bottom 36 portions of the air bag. This bubble momentarily acts as a wall or restraint. Thereafter the folded portions of the air bag are inflated, unfolded and propelled towards the occupant and away from the bubble 136. The air bag presses against the deployment door causing it to open at its tearable seam 138. The deployment door is opened and rotates about its hinge 140. As can be seen the deployment door, in the configuration shown, is mounted to the top of the instrument panel. For reference purposes the windshield 142 is also shown in phantom line. If the air bag is folded in accordance with the second embodiment of the invention as shown in FIGS. 20–22 test data shows that the bag is filled at a lower pressure than the air bag folded in accordance with the above referenced patent or the first embodiment of the invention. It is believed that the bubble 136 initially presses the end pleat 120 against the retainer 44 thereafter the pleats the tucks in this end pleat 120 are gently unfolded producing the inflation charastic shown in FIG. 23. FIG. 24 shows still another embidiment of the invention. More specifically there is shown an air bag 30 in what is called a mid-mount configuration.

The air bag uses the folding technique of FIGS. 20–22 with the exception that the initial folding steps place the bottom of the bag on the folding surface. In this configuration the bubble is positioned downwardly relative to the instrument panel 132. By reversing the initial fold steps and the placement of the bubble the air bag so folded will inflate and tend to balloon upwardly, opposite to the shown in FIG. 23, protecting the upper torso of the occupant.

Many changes and modifications in the above described embodiment of the invention can, of course, be carried out without departing from the scope thereof. Accordingly, that scope is intended to be limited only by the scope of the appended claims.

We claim:

1. A method of folding an air bag (30), the air bag including material defining a top (32), front (34), and bottom (36) portions and side panels (38a,b) and an open inlet end (48), comprising the steps of:
    a) securing the inlet end about a retainer (44), the retainer having a determinable length, diameter, and first and second ends;
    b) positioning the retainer (44) relative to a folding surface;
    c) defining a line in the material to be laid on the folding surface such line determining a tip end (70);
    d) positioning the material so with one of the top portion (32) and bottom portion (36) laid upon the folding surface and with a first portion (92) of the air bag extending to the right of the first end, a second portion (94) extending to the left of the second end of the retainer a middle portion therebetween
    e) forming in the material a plurality of axially extending pleats and tucks (74, 72) each pleat (74) having an end laid relatively colinear to the tip end (70) to reduce the length of the material extending outward from the retainer;
    f) defining in the air bag first, second and third parallel fold lines (84, 86, 90) which extend perpendicular to a longitudinal axis (80) of the retainer, the second fold line situated between the first and third fold lines, the distance between the first and third fold lines defining a desired width of the folded air bag;
    g) folding over the first portion inwardly, toward the second fold line, about the first fold line defining a first folded over portion;
    h) folding over the first folded over portion outwardly toward the first fold line about the second fold line;
    i) continuing folding the first portion at the first and second fold lines until the there is no longer enough material to be folded over either the first or the third any fold line;
    j) folding over the second portion inwardly, toward the second fold line, about the third fold line defining a second folded over portion;
    k) folding over the second folded over portion outwardly toward the third fold line at the second fold line;
    l) continuing folding the second portion about the third and second fold lines until the there is no longer enough material to be folded over any fold line;
    m) positioning the folded over portions (92', 94') resulting from the folding of the first and second portions of the air bag parallel to one another, the material of the air bag in the folded over configuration farthest from the retainer defining a pleated end (75).

2. The method as defined in claim 1 including the steps of:
    a) folding pleated end (75) containing the plurality of pleats and tucks toward the retainer about a fourth fold line (100), parallel to the longitudinal axis of the retainer, the portion of the air bag folded over the fourth fold line defining a first end pleat (102) including a top flap (105) and a bottom flap (107);

b) moving the first end pleat (102) against the retainer (44) with the top flap (105) adjacent the retainer (44) and the pleated end (75) facing downwardly, wherein as the first end pleat (102) is moved, material between the first end pleat (102) and the retainer is folded upon itself forming a second end pleat (104);

c) folding the second end pleat (104) about a fifth fold line and d) positioning the second end pleat adjacent the first end pleat to achieve a folded air bag.

3. The method as defined in claim 2 wherein the step of positioning the second end pleat includes positioning an end of the second end pleat in an overlapping relation to an extending end of the first end pleat.

4. The method as defined in claim 3 including the step of placing a deployment flap (110) on the retainer, the deployment flap partially enveloping the folded air bag.

5. The method as defined in claims 4 including the step of covering the folded air bag with a tearable material.

6. The method as defined in claim 1 including the steps of a) moving the pleated end (75) of the air bag having the pleats and tucks toward the retainer and placing the pleated end vertical and extending upwardly, wherein the moving of the pleated end forms a first end pleat in the material, b) folding the first end pleat about a fourth fold line parallel to the axis of the retainer and positioning the first end pleat adjacent the pleated end.

7. The method as defined in claim 6 including the step of placing a deployment flap on the retainer, the deployment flap partially enveloping the folded air bag.

8. The method as defined in claim 7 including the step of covering the folded air bag with a tearable material.

9. The method as defined in claim 1 wherein the step of positioning the retainer includes mounting the retainer a predetermined distance above the folding surface.

10. An air bag assembly comprising an air bag having an inlet end, and a cylindrical retainer, the retainer including first and second ends, the inlet end of the air bag secured to the retainer, and except for any portion of the air bag in contact with the retainer, the remaining portions of the air bag extend from a side of the retainer in a folded configuration, the folded configuration comprising a first folded portion and a second folded portion, the first and second folded portions formed from generally flattened first and second portions each initially extending fowardly relative to a respective end of the retainer, the first portion folded sequentially inwardly and outwardly generally at the locations of a first fold line and a second fold line to define the first folded portion, the first fold line extending perpendicularly to the side of the retainer at the first end thereof, the second fold line extending parallel to the first fold line generally midway between the ends of the retainer;

the second portion folded sequentially inwardly and outwardly generally at the locations of about a third fold line and the second fold line to define the second folded portion, the second folded portion laid parallel to the first folded portion, the third fold line extending generally parallel to the first fold line at the second end of the retainer.

* * * * *